US008779935B2

(12) United States Patent
Savchenko

(10) Patent No.: US 8,779,935 B2
(45) Date of Patent: Jul. 15, 2014

(54) SYSTEMS AND METHODS FOR SIMULATING MOTION WITH SOUND

(76) Inventor: Vladimir Savchenko, Vancouver (CA)

( * ) Notice: Subject to any disclaimer, the term of this patent is extended or adjusted under 35 U.S.C. 154(b) by 1150 days.

(21) Appl. No.: 12/438,127

(22) PCT Filed: Aug. 21, 2007

(86) PCT No.: PCT/US2007/018505
§ 371 (c)(1),
(2), (4) Date: May 18, 2010

(87) PCT Pub. No.: WO2008/024361
PCT Pub. Date: Feb. 28, 2008

(65) Prior Publication Data
US 2010/0289663 A1    Nov. 18, 2010

Related U.S. Application Data

(60) Provisional application No. 60/839,374, filed on Aug. 21, 2006.

(51) Int. Cl.
| | | |
|---|---|---|
| G08G 1/00 | (2006.01) | |
| G08G 1/16 | (2006.01) | |
| G08G 1/095 | (2006.01) | |
| B60Q 1/50 | (2006.01) | |
| G08B 13/24 | (2006.01) | |
| G08B 13/08 | (2006.01) | |
| G01P 3/54 | (2006.01) | |
| G01P 3/66 | (2006.01) | |
| B60Q 3/00 | (2006.01) | |

(52) U.S. Cl.
USPC ........... 340/688; 340/901; 340/903; 340/908; 340/467; 340/551; 340/547; 324/174; 324/179; 362/459

(58) Field of Classification Search
USPC .......... 340/901–952, 467, 551, 547; 324/174, 324/179; 362/459
See application file for complete search history.

(56) References Cited

U.S. PATENT DOCUMENTS

| | | | | |
|---|---|---|---|---|
| 3,916,234 A | * | 10/1975 | Stigall et al. | .................. 310/155 |
| 5,315,285 A | | 5/1994 | Nykerk | |
| 5,570,087 A | | 10/1996 | Lemelson | |
| 5,736,923 A | * | 4/1998 | Saab | ............................ 340/429 |

(Continued)

FOREIGN PATENT DOCUMENTS

WO    2008024361    2/2008

OTHER PUBLICATIONS

Patent Cooperation Treaty—International Searching Authority, International Search Report, Apr. 10, 2008, 2 pages.

(Continued)

*Primary Examiner* — Daniel Wu
*Assistant Examiner* — Mohamed Barakat
(74) *Attorney, Agent, or Firm* — Michael R. Schacht; Schacht Law Office, Inc.

(57) ABSTRACT

A movement warning system for notifying a proximal entity of the approach of a vehicle comprising a sensor system, a controlling mobile device, and a signal generator system. The sensor system generates motion data indicative of movement of the vehicle. The controlling mobile device generates at least one warning signal based on the motion data. The signal generator system generates at least one warning based on the to at least one warning signal. The signal generator generates the warning such that the proximal entity perceives the warning.

14 Claims, 5 Drawing Sheets

(56) References Cited

U.S. PATENT DOCUMENTS

| | | | | |
|---|---|---|---|---|
| 5,864,304 A | * | 1/1999 | Gerszberg et al. | 340/903 |
| 6,060,989 A | | 5/2000 | Gehlot | |
| 6,154,025 A | * | 11/2000 | Schelter et al. | 324/207.21 |
| 6,154,123 A | | 11/2000 | Kleinberg | |
| 6,263,282 B1 | | 7/2001 | Vallancourt | |
| 6,366,207 B1 | | 4/2002 | Murphy | |
| 6,416,020 B1 | * | 7/2002 | Gronskov | 246/169 D |
| 6,438,491 B1 | | 8/2002 | Farmer | |
| 6,459,365 B2 | | 10/2002 | Tamura | |
| 6,502,035 B2 | | 12/2002 | Levine | |
| 6,541,959 B2 | * | 4/2003 | Gudgeon et al. | 324/207.15 |
| 6,590,495 B1 | * | 7/2003 | Behbehani | 340/435 |
| 6,606,027 B1 | | 8/2003 | Reeves et al. | |
| 6,636,149 B2 | | 10/2003 | Moon | |
| 6,646,432 B1 | * | 11/2003 | Malinowski | 324/171 |
| 6,900,723 B2 | | 5/2005 | Yamanaka et al. | |
| 7,079,024 B2 | * | 7/2006 | Alarcon | 340/539.11 |
| 7,411,175 B2 | * | 8/2008 | Schwartz | 250/221 |
| 7,983,836 B2 | * | 7/2011 | Breed | 701/117 |
| 8,106,757 B2 | * | 1/2012 | Brinton et al. | 340/439 |
| 8,136,969 B2 | * | 3/2012 | Burkett | 362/459 |
| 2001/0009367 A1 | * | 7/2001 | Seitzer et al. | 324/207.21 |
| 2003/0122663 A1 | * | 7/2003 | Carlson et al. | 340/467 |
| 2003/0220722 A1 | | 11/2003 | Toba et al. | |
| 2004/0022416 A1 | | 2/2004 | Lemelson et al. | |
| 2004/0036587 A1 | | 2/2004 | Jefferson | |
| 2005/0035878 A1 | * | 2/2005 | Vassilevsky | 340/902 |
| 2005/0175186 A1 | * | 8/2005 | Yasushi et al. | 381/61 |
| 2005/0232432 A1 | | 10/2005 | Yasushi et al. | |
| 2005/0246100 A1 | | 11/2005 | Nath et al. | |
| 2006/0001532 A1 | | 1/2006 | Nagata | |
| 2006/0085635 A1 | * | 4/2006 | Park | 713/159 |

OTHER PUBLICATIONS

Agilent ADNB-6011 and ADNB-6012 High Performance Laser Mouse Bundles Datasheet; Published by Agilent Technologies, Jul. 4, 2005.

PLN2020 twin-eye laser sensor; Published by Philips Electronics N.V. Sep. 2005.

* cited by examiner

SYSTEMS AND METHODS FOR SIMULATING MOTION WITH SOUND

RELATED APPLICATIONS

This application, U.S. patent application Ser. No. 12/438,127 filed May 18, 2010, is a 371 of PCT Patent Application No. PCT/US2007/018505 filed Aug. 21, 2007, which claims priority benefit of U.S. Provisional Application Ser. No. 60/839,374 filed on Aug. 21, 2006.

The contents of all related applications listed above are incorporated herein by reference.

FIELD OF THE INVENTION

The present invention relates to the generation of sound based on motion, and, more particularly, to systems and methods for generating sounds to warn proximal entities and the like of the approach of vehicles.

BACKGROUND OF THE INVENTION

The present invention relates to vehicles that do not emit sufficient noise for proximal entities and the like to sense the approach of the vehicle. The term "vehicle" will be used herein to refer to any moving object. Vehicles with which the present invention may be used include non-propelled vehicles and vehicles that are propelled by human power and/or may be motorized. An example of a non-propelled vehicle would be a trailer. Examples of human powered vehicles include bicycles, tricycles, quadracycles, velomobiles, skateboards, rollerblades, or scooters. Examples of motorized vehicles include cars, trucks, motorcycles, boats, personal watercraft, construction equipment, and overhead cranes. Motorized vehicles may be driven by devices such as internal combustion engines, electric motors, compressed air engines, and/or combinations such devices. In addition, certain vehicles are both motorized and can operate partly or wholly under human power.

Currently, the vast majority of powered vehicles employ internal combustion engines. A typical internal combustion engine is clearly audible when operating. A vehicle powered by an internal combustion engine is thus clearly audible to most humans or other animals. The term "proximal entities" will be used herein generally to refer to humans or other animals within the vicinity who are capable of heeding a warning transmitted from a vehicle that is moving or about to move. One important example of a proximal entity is a human pedestrian. The term "proximal entity" can also include machinery capable of reacting to the warning transmitted from such a vehicle.

Many engine technologies that are currently considered alternative, such as electric motors, are quiet and may not be audible to proximal entities. The term "quiet engine" will be used herein to refer to any engine technology that is not clearly audible when operating. Human powered vehicles and vehicles with alternative or quiet engine technologies typically operate at least part of the time without the use of an internal combustion engine. The term "low noise vehicles" will be used herein to refer to vehicles that are capable of movement without the use of an engine, using quiet engine technologies, or under human power. Low noise vehicles moving at higher speeds can sometimes be audible because of the movement of air over the surface of the vehicle. However, at low speeds, low noise vehicles can be essentially silent, providing little audible warning to proximal entities of their approach.

Because low noise vehicles do not make enough noise to provide notice to proximal entities that the vehicle is approaching, low noise vehicles potentially pose a risk to proximal entities. As more vehicles are introduced using alternative engine technologies, the risk to proximal entities of being struck by a low noise vehicle increases.

The need thus exists for systems and methods of warning proximal entities that a low noise vehicle is moving or about to move.

RELATED ART

Clearly, even vehicles using conventional internal combustion engines pose risks to proximal entities when starting to move or when moving slowly. At low speeds, such vehicles can be fairly quiet and thus essentially inaudible to proximal entities under certain circumstances. For example, even conventional vehicles with internal combustion vehicles may be inaudible to proximal entities with hearing deficiencies or in locations with significant background noise.

The risks posed to proximal entities by moving vehicles are significantly increased in larger vehicles with restricted operator visibility, especially when backing up. Accordingly, certain classes of vehicles such as large trucks have long been provided reverse-movement warning systems that emit an audible signal when a vehicle is placed in reverse. Reverse-movement warning systems only operate on vehicles with a transmission system that can be monitored for a reverse mode of operation and do not provide warning when the vehicle is moving forward. Further, reverse movement warning systems are not configured to provide warning of unintentional reverse movement, such as when the transmission system is in neutral or has failed.

More sophisticated movement warning systems, such as those described in United States Patent Application Publication Nos. 2005/0175186 and 2003/0220722 and WIPO International Publication Number WO 00/12354, generate an audible warning based on components of the conventional internal combustion engine, such as starter, transmission, throttle, brake pedal, and odometer. Vehicles employing alternative engine technologies may not employ the same or similar components, and the systems disclosed in the publications listed above may not be applicable to vehicles using alternative engine technologies.

Additionally, conventional movement warning systems are designed to generate warning signals when the vehicle equipped with the warning system is attended by an operator. In a runaway situation, the operator is not present to operate the vehicle, and a warning system designed to operate based on operation of components such as the transmission system, throttle, and/or brake, may not provide adequate warning to proximal entities.

Further, as described above, many vehicles, such as bicycles, scooters, trailers, and rail cars, are either not powered or are human powered. Conventional movement warning systems such as those described in the references cited above are not designed to operate in conjunction with vehicles that are unpowered, powered by humans, and/or powered by alternative energy storage and conversion systems such as electricity, air, wind, and/or steam.

An additional problem with existing movement warning systems is that the warning signal is often generated at least in part based on conventional odometers and speedometers. Automobile odometers and speedometers are not highly responsive at low speeds. Bicycle computers generate a speed signal based on magnetic switches that require at least one full rotation of the bicycle wheel. Because a movement warning system requires fast and accurate detection of movement, conventional odometers and speedometers are generally not sufficiently responsive or accurate to allow generation of a warning signal in all risk situations.

SUMMARY OF THE INVENTION

The present invention may be embodied as a movement warning system for notifying a proximal entity of the approach of a vehicle comprising a sensor system, a controlling mobile device, and a signal generator system. The sensor system generates motion data indicative of movement of the vehicle. The controlling mobile device generates at least one warning signal based on the motion data. The signal generator system generates at least one warning based on the at least one warning signal. The signal generator generates the warning such that the proximal entity perceives the warning.

DETAILED DESCRIPTION

Figure 1:
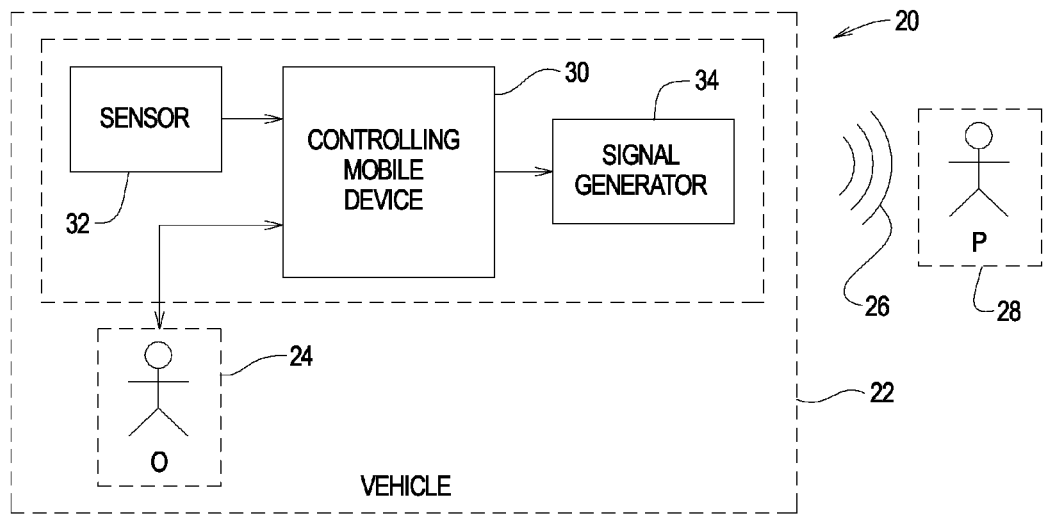
FIG. 1 is a simplified block diagram depicting one example implementation of a movement warning system of the present invention.

Referring initially to FIG. 1 of the drawing, depicted at 20 therein is a first example movement warning system constructed in accordance with, the principles of the present invention. The example movement warning system 20 is adapted to be mounted to a vehicle 22 operated by an operator 24. The operator 24 is associated with the vehicle 22 and is typically, but not necessarily, riding the vehicle. In any event, the example movement warning system 20 can be configured to operate in an unattended mode in which the system 20 is operating but the operator 24 is not controlling or otherwise aware of the status of the vehicle 22.

The movement warning system 20 is configured to transmit a warning signal 26 to a proximal entity 28 in the vicinity of the vehicle 22. The example movement warning system 20 comprises a controlling mobile device 30, a sensor system 32, and a signal generator system 34. The controlling mobile device 30 is a portable computing device capable of running a movement warning software program implementing logic, signal processing, and communications functions as will be described in further detail below.

In the example movement warning system 20, the controlling mobile device 30 is a mobile telephone. A mobile telephone typically provides a universal computing and sound processing platform that is highly appropriate for running the movement warning software used to implement the example movement warning system 20. In addition to hardware providing general data processing, telephony, and sound processing capabilities, mobile telephones may also be provided with hardware, such as keypads, video display screens, still and video cameras, global position system (GPS) receivers, wireless communications systems, accelerometers, motion detectors, and the like, that can simplify the implementation of a movement warning system of the present invention. The example controlling mobile device 30 is thus typically not dedicated to a particular type of vehicle but may be loaded with movement warning software customized for one or more vehicles types that the operator 24 anticipates operating.

While cellular telephones are particularly suited for use as the controlling mobile device 30, electronic devices other than cellular telephones may be used as the controlling mobile device 30. For example, devices such as handheld computers and music players may comprise general data processing, communications, and signal processing capabilities that may be used to run the movement warning software as described herein.

The sensor system 32 generates analog or digital movement signals or data indicative of movement of the vehicle 22. Often, the sensor system 32 will designed specifically for a given type of vehicle. If the sensor system 32 is designed a given type of vehicle, the sensor system 32 should be configured to generate movement signals or data to allow implementation of the movement warning software processing described herein for that type of vehicle. If the sensor system 32 is configured for a given type of vehicle, the sensor system 32 generates the movement signals or data either continuously or at a sufficiently high refresh rate for the given vehicle type to allow the warning signal 26 to be generated quickly enough to function as an adequate warning to the proximal entity 28. In any event, a general type of sensor system 32 may be provided to allow a warning signal 26 to be generated based on movement of any type of vehicle operated by the operator 24.

The signal generator system 34 can take many forms but, in the example movement warning system 20, is an audio transducer capable of converting an electrical audio signal into a sound signal. The sound signal forms the warning signal 26 and is transmitted at a level that is audible to proximal entities 28 having at least a minimum level of hearing capabilities. The signal generator system 34 may be adapted for and permanently connected to a particular type of vehicle or may be implemented using the sound reproduction system of the mobile telephone forming the controlling mobile device 30.

Figure 2:
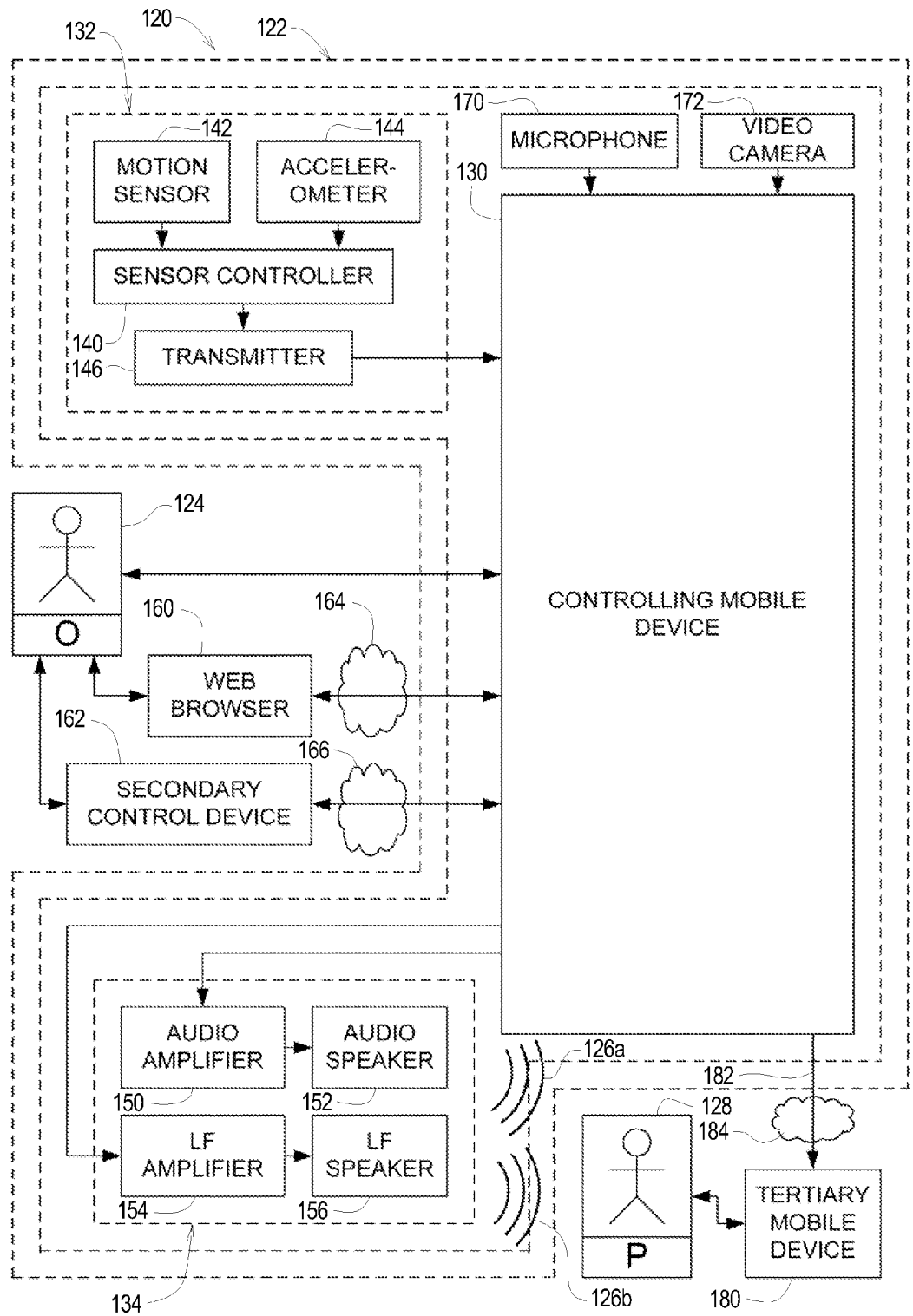
FIG. 2 is a block diagram depicting another example implementation of a movement warning system of the present invention.

Referring now to FIG. 2 of the drawing, depicted at 120 therein is a second example movement warning system constructed in accordance with the principles of the present invention. The example movement warning system 120 is adapted to be mounted to a vehicle 122 operated by an operator 124. The operator 124 is associated with the vehicle 122 but in this case is not riding the vehicle. The movement warning system 120 is configured to transmit warning signals 126a and 126b to a proximal entity 128 in the vicinity of the vehicle 122. The example movement warning system 120 comprises a controlling mobile device 130, a sensor system 132, and a signal generator system 134.

Again, the controlling mobile device 130 is a portable computing device capable of running a movement warning software program implementing logic and signal processing as will be described in further detail below. As with the movement warning system 20 described above, the controlling mobile device 130 is a mobile telephone. The example controlling mobile device 130 is thus also not typically dedicated to a particular type of vehicle but may be loaded with movement warning software customized for one or more vehicles types that the operator 124 anticipates operating.

The sensor system 132 generates analog or digital movement signals or data indicative of movement of the vehicle 122. The example sensor system 132 comprises a sensor controller 140, a motion sensor 142, an accelerometer 144, and a transmitter 146.

The sensor controller 140 is typically a general purpose microprocessor having dedicated volatile and non-volatile memory. The sensor controller 140 stores and runs a sensor program that collects raw motion data from the motion sensor 142 and the accelerometer 144 and converts the raw motion data into processed motion data such as time, linear distance, speed, and acceleration.

The motion sensor 142 generates raw motion data indicative of the angular and linear movement of the sensor system 132. The accelerometer 144 generates raw acceleration data indicative of the change of speed of the sensor system 132. The sensor system 132 is rigidly attached to the vehicle 122 such that the raw motion data generated by the motion sensor 142 and accelerometer 144 corresponds to direction of movement and change of rate of speed of the vehicle 122. The motion sensor 142 and accelerometer 144 are well-known and available in the marketplace. Typically, but not necessarily, the motion sensor 142 and accelerometer 144 generate analog signals that must be converted in digital data by an analog-to-digital converter (ADC) for use by the sensor controller 140. The sensor program running on the sensor controller 140 calculates the processed motion data based on the raw motion data and the raw acceleration data.

Under control of the sensor controller 140 and/or the controlling mobile device 130, the transmitter 146 transmits the processed motion data to the controlling mobile device 130. The transmitter 146 further allows the controlling mobile device 130 to transmit data such as control commands to the sensor controller 140. The transmitter 146 may be configured to transmit data to and receive data from the controlling mobile device 130 using wired and/or wireless communications systems such as Bluetooth.

The example signal generator system 134 used by the movement warning system 120 is an audio transducer capable of converting one or more electrical audio signals into one or more warning sounds. In particular, the example signal generator system 134 comprises an audio amplifier 150, an audio speaker 152, a low frequency amplifier 154, and a low frequency speaker 156. The controlling mobile device 130 transmits an audio signal to the audio amplifier 150 and a low frequency signal to the low frequency amplifier 154. The audio signal and low frequency signal may be transmitted through wires or wirelessly using conventional signal transmission systems.

The audio amplifier 150 generates an amplified electrical audio signal based on the audio signal, and the audio speaker 152 converts the amplified audio electrical signal into the first warning signal 126a. The low frequency amplifier 154 generates an amplified low frequency electrical signal based on the low frequency signal, and the low frequency speaker 156 converts the amplified low frequency electrical signal into the second warning signal 126b.

The audio amplifier 150 and speaker 152 are configured to generate sounds within the range frequencies audible to the human ear (e.g., from 20 Hz to 20,000 Hz). In many situations, the first warning signal 126a may be sufficient effectively to transmit data to the proximal entity 128; in these cases, the low frequency amplifier 154 and speaker 156 may not be required.

In other situations, the low frequency amplifier 154 and speaker 156 may be used as an effective complement to or instead of the audio amplifier 150 and speaker 152. In particular, the low frequency amplifier 154 and speaker 156 are configured to generate sounds (e.g., below 100 Hz). Sounds below 20 Hz are often referred to as infrasound. Infrasound has been shown to create a feeling of anxiety in humans and can travel through certain objects that do not transmit audible sounds. Low frequency sounds effectively simulate low speed motion of a vehicle in a closed or obstructed environment such as an alley, at street corners, or in a parking lot. Since low frequency sounds are felt rather than heard, the use of a warning signal such as the second warning signal 126b is of particular significance when the proximal entity has diminished or no hearing, when the audible sounds would otherwise be muffled, and/or in environments with high levels of ambient sounds.

The speakers 152 and 156 are positioned such that the warning signal 126a and 126b are projected in one or more directions most likely to warn the proximal entity 128 of the approach of the vehicle 122. While only one of each type of speaker 152 and 156 is depicted in FIG. 2, a plurality of each of the speaker types may be provided, each arranged to project the warning signals 126a and 126b in different directions. Further, the controlling mobile device 130 may transmit electrical signals only to amplifiers and associated speakers in the direction of travel.

Referring back to FIG. 2, it can be seen that the example movement warning system 120 further comprises a web browser 160 and a secondary control device 162, and the operator 124 may communicate either directly with the controlling mobile device 130 or indirectly through the web browser 160 or the secondary control device 162. The example web browser 160 may be a computer or other device running a conventional web browser capable of connecting to the controlling mobile device 130 through one or more communications systems such as the Internet, a cellular telephone system, and/or a conventional land-based telephone system represented by a cloud 164. The example secondary control device 162 may be a land or cellular telephone or other device similarly capable of connecting to the controlling mobile device 130 through one or more communications systems represented by a cloud 166.

In addition, the example movement warning system 120 further comprises a microphone 170 and a video camera 172. The microphone 170 and video camera 172 may be integral to the controlling mobile device 130 or may be provided separately and mounted on the vehicle 122 as appropriate for a given operating environment. In either case, the microphone 170 and video camera 172 generate audio and video signals, respectively, that are communicated to the controlling mobile device 130. When a cellular telephone is used as the controlling mobile device 130, the controlling mobile device 130 typically has an audio system and/or video display system capable of reproducing audio and displaying video based on the audio and video signals. Many cellular telephones have communications capabilities that allow the audio, video and control signals to be transmitted to remote devices such as the web browser 160 and/or the secondary control device 162.

FIG. 2 further illustrates that the proximal entity 128 may be in possession of a tertiary mobile device 180. The example tertiary mobile device 180 allows the controlling mobile device 130 to send a direct warning signal 182 directly to the tertiary mobile device 180. The tertiary mobile device may, like the controlling mobile device 130 and the secondary control device 162, be a cellular telephone. In this case, the controlling mobile device 130 may be configured to send the direct warning signal 182 directly to the mobile tertiary device 180 or indirectly through communications networks 184 such as the Internet, a cellular telephone network, and/or a conventional telephone network.

Upon receipt of the direct warning signal 182, the tertiary mobile device 180 may communicate a warning to the proximal entity using one or more mechanisms not available to the controlling mobile device 130. For example, in addition to sound, the tertiary mobile device 180 may flash a light and/or vibrate in a manner that might be more apparent to the proximal entity 128 than the first and second warning signals 126a and 126b described above. Such light flashes and vibrations may be, in a patterns, colors, and the like that could be associated in advance with moving vehicles.

Additionally, if the proximal entity 128 is wearing headphones connected to the tertiary mobile device 180, the headphones may prevent at least warning signals of the first type 126a from being heard by the proximal entity. The tertiary mobile device 180 could transmit the warning signal to the proximal entity through the headphones.

Figure 3:
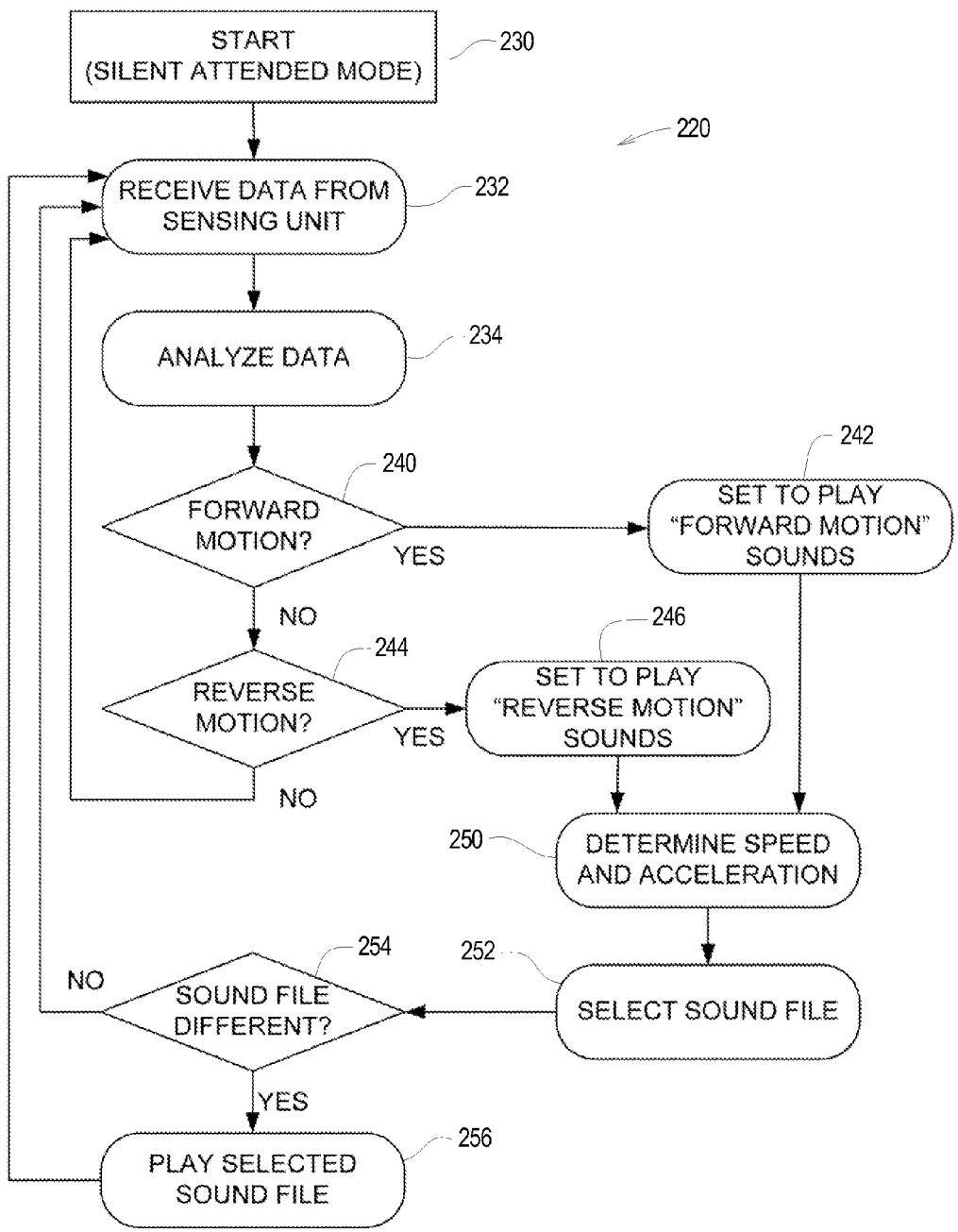
FIG. 3 illustrates a diagram depicting one example of processing that may be implemented by a movement warning system of the present invention.

Referring now to FIG. 3 of the drawing, depicted therein is a program 220 representing one example of logic that may be used to implement at least a portion of the motion warning software running on the controlling mobile device.

The example motion warning program described herein operates in attended and unattended modes. The example motion warning program operates in a similar manner both the attended and unattended modes, but different sound files may be associated with the two modes. Upon or before entering the vehicle, the operator 24 or 124 will typically place the motion warning program in the attended mode by entering a code associated with this mode into the controlling mobile device either directly or indirectly as described above. The motion warning program can be manually configured to enter the unattended mode by entering a code associated with this mode into the controlling mobile device or can enter the unattended mode automatically, such as when no motion has been detected for a predefined period of time.

The program 220 starts in attended mode at an initial step 230. At a step 232, the program 220 receives data from a sensor system such as any of the example sensor systems described herein. The transmission of data may be initiated by the either the sensor system or the controlling mobile device. At a step 234, the program 220 processes the data received at step 232 to allow the data to be compared with certain thresholds, limits, parameters and the like as necessary to implement the remaining steps of the program 220.

In particular, at a step 240, the program 220 determines whether the data suggests forward motion of the vehicle. If it is determined at step 240 that the data suggests forward motion, the program 220 moves to step 242 at which the controlling mobile device is set to play a FORWARD MOTION sound. If it is determined at step 240 that the data does not suggest forward motion, the program 220 moves to step 244, which determines whether the data suggests reverse motion of the vehicle. If not, the program returns to step 232. If it is determined at step 244 that the data does suggest reverse motion, the program 220 moves to step 246 at which the controlling mobile device is set to play a REVERSE MOTION sound.

After either of the steps 242 or 246, the program moves to a step 250, at which the controlling mobile device determines speed and acceleration of the vehicle. The program next moves to step 252, at which the controlling mobile device selects a sound file based on one or more factors such as whether the controlling mobile device is set to play a FORWARD MOTION sound or a REVERSE MOTION SOUND and the speed and acceleration of the vehicle. At step 254, the program 220 determines whether the selected sound file is different from a sound file that is currently playing. If yes, the program 220 directs the controlling mobile device to play the selected sound file at step 256 instead of the sound file that is currently playing. The program then returns to step 232. If the selected sound file is not different from the selected sound file (i.e., the selected sound file is the same as the playing sound file), the program returns directly to step 232.

Figure 4:
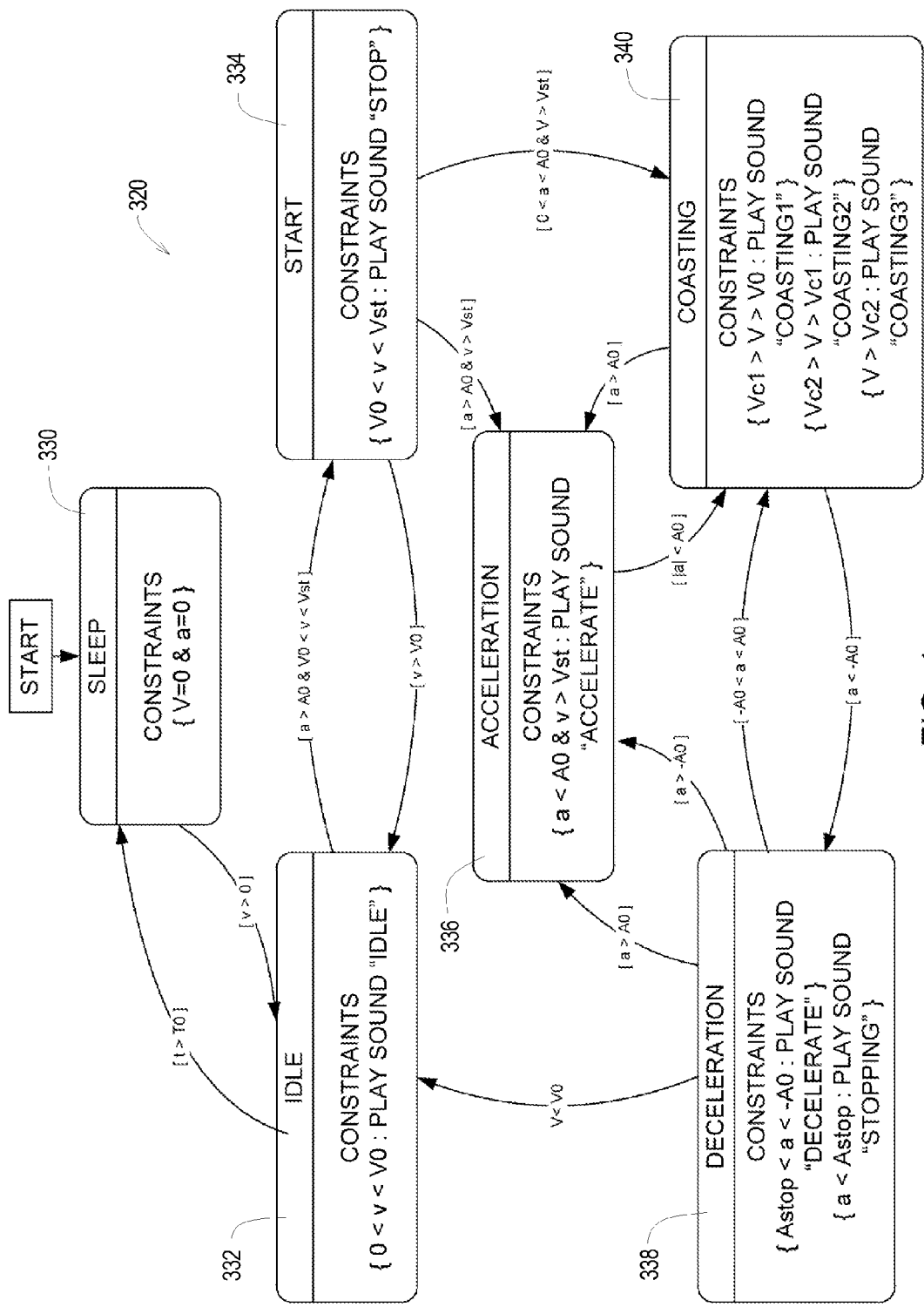
FIG. 4 illustrates a diagram depicting one example of a sound file selection system that may be implemented by a movement warning system of the present invention.

Referring now to FIG. 4 of the drawing, depicted at 320 therein is an example method of selecting an appropriate sound file for each of a plurality of motion states. The example method 320 comprises a SLEEP state 330, an IDLE state 332, a START state 334, an ACCELERATION state 336, a DECELERATION state 338, and a COASTING state 340.

As shown in FIG. 4, each state is defined by constraints associated with vehicle parameters such as velocity and acceleration of the vehicle, and the method 320 moves between states according to logic based on changes in these vehicle parameters. FIG. 4 further illustrates that each state is associated with one or more sound files that are played depending upon the values of certain vehicle parameters. The vehicle parameters used by the example method 320 to select an appropriate sound file are listed below:

v current speed (e.g., Km/hour or miles/hour);
a current acceleration (e.g., Km/hour per second or miles/hour per second);
V0 speed limit considered as zero speed;
A0 acceleration limit considered as zero acceleration or deceleration (constant speed motion);
Vst max speed limit for starting sound;
Vc1 first speed limit for coasting sounds;
Vc2 second speed limit for coasting sounds;
Vc3 third speed limit for coasting sounds;
Astop deceleration limit for stopping sound;
|a| absolute value of acceleration;
T0 time interval for moving system from IDLE state 332 to SLEEP state 330.

One embodiment of the motion warning software program is implemented using the Java programming language, which is supported by many mobile devices such as cellular telephones. However, the logic described herein may be written in other programming languages. The sound files associated with the various states described in FIG. 4 should be selected so that they have some association with the type of movement the vehicle is undergoing. In this context, the FORWARD MOTION would likely be different from the REVERSE MOTION sound; similarly, the ACCLERATE and DECELERATE sounds would also likely be different.

The controlling motion device used as part of a system of the present invention will have the capability to play digital sound files such as polyphonic ring tones, MP3 (MPEG) files, WAV files, Tunes files, MIDI files, or any other digital or analog sound recording formats. Packages of digital sound files conforming to predefined themes may be provided or created by the operator 24 or 124.

The motion warning program may be configured to allow the operator 24 or 124 to associate sound files with the various states described in FIG. 4. In this context, motion warning program may also be configured to allow the operator to compose, record, digitally modify, and/or import sound files. Alternatively, the operator may create these sound files using third party software. The operator may elect to purchase a predefined package of sounds. In any of these cases, the operator may configure the motion warning program to use sounds that the operator likes. As examples, the sound themes may be conventional cars, steam locomotive, jet airplane, horse, or even the operators own voice.

In unattended mode, the sounds can be configured to indicate that the vehicle is unattended. For example, the sound file may be reproduce as a voice stating one of the following comments: "this vehicle is remotely monitored"; "intrusion warning"; "help"; "forward motion warning"; "get out—this vehicle is out of control". Any of these sounds can be digitally mixed or overlapped with sounds corresponding to motion states of the attended mode creating hybrid sounds such as the combination of a roaring engine (attended sound) and a verbal warning ("this vehicle is unattended").

Each sound file can have a number of attributes. The attributes define how the controlling mobile device plays the particular file. Examples of such attributes include volume level, minimum time to play before interrupting, and pace (e.g., minimum pace or maximum pace). The volume level may be set to a predetermined maximum determined by a given environment or by governmental regulation.

Figure 5:
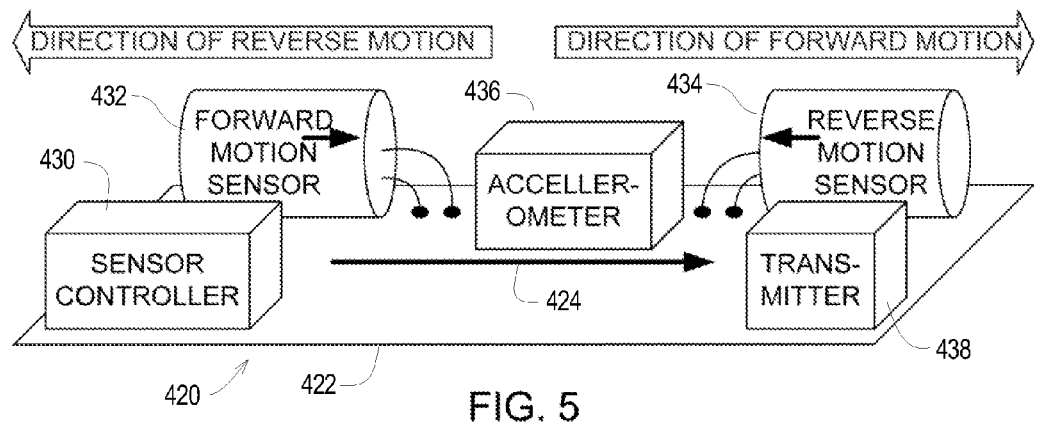
FIG. 5 illustrates a perspective view of an example circuit board that may be used by a movement warning system of the present invention.

Turning now to FIG. 5 of the drawing, depicted therein is an example sensor assembly 420 that may be used as or as a part of the sensor system 32 described above. The sensor assembly 420 comprises a circuit board 422 that defines a board direction indicated by arrow 424 in FIG. 5. Mounted on the example circuit board 422 is a sensor controller 430, a forward motion sensor 432, a reverse motion sensor 434, an accelerometer 436, and a transmitter 438. The circuit board 422 electrically interconnects the various components 432-438 in a conventional fashion to form a circuit that operates as will be described in further detail below.

The accelerometer 436 may be a 3-axis digital accelerometer such as is sold by Freescale Semiconductor Inc. The accelerometer 436 generates raw motion data indicative of forward and reverse acceleration in 3-axes. The accelerometer 436 is positioned on the circuit board 422 such that a predetermined one of the axes defined by the accelerometer 436 is somewhat aligned with or parallel to the board direction 424.

The motion sensors 432 and 434, which may be used instead of or in addition to the accelerometer 436, are simple shock acceleration switches such as ASL model shock acceleration switches sold by SMC International Inc. A shock acceleration switch sensor measures shock/acceleration only in one direction; the sensor assembly 420 thus comprises two such switch sensors arranged facing each other in a horizontal plane and along a line parallel to the board direction 424.

The sensor assembly 420 is mounted on the vehicle in question with the board direction indicated by the arrow 424 facing in the forward direction of travel of the vehicle. The sensor controller 430 is similar to the sensor controller 140 described above and generates processed motion data based on the raw motion data generated by the accelerometer 436 and/or the motion sensors 432 and 434. The transmitter is operatively connected to the sensor controller 430 and the controlling mobile device to allow data and commands to be transferred therebetween.

Figure 6:
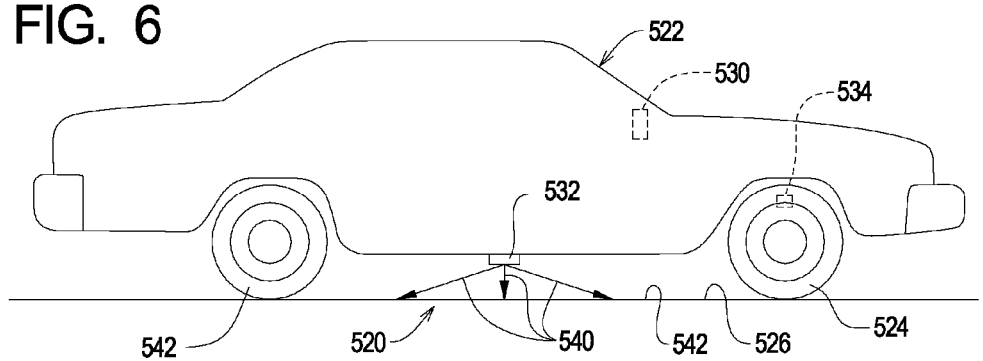
FIG. 6 is a somewhat schematic side elevation view depicting an example movement warning system of the present invention as applied to an automobile.

Referring now to FIG. 6 of the drawing, depicted therein is mounted another example movement warning system 520 mounted on a vehicle in the form of an automobile 522 comprising a plurality of wheels 524. Instead of or addition to motion sensors and/or accelerometers, the movement warning system 520 employs a controlling mobile device 530 and at least one of a first sensor assembly 532 and a second sensor assembly 534.

The first sensor assembly 532 is a linear motion laser sensor that is mounted underneath the automobile 522. The first sensor assembly 532 emits laser beams 540 that are directed towards a surface 542 on which the automobile 522 is traveling and away from any proximal entities. Linear motion laser assemblies can be mounted in a number of ways and can be adapted to measure speed and directional motion of the ground 526 relative to the automobile 522.

The second sensor assembly 534 is a magnetic field or laser sensor arranged adjacent to one of the wheels 524. A magnetic field sensor can be adapted to generate data, such as direction of rotation and rate of angular rotation, describing the rotation of the wheel 524. The sensor assembly 534 may comprise a magnetic field sensor such as the HMC1512 sensor sold by Honeywell. As one example of an appropriate laser sensor, the Phillips Laser Sensor PLN2020, which was designed primarily for use in computer pointing devices, can be adapted to measure the direction and angular rotation of the wheel 524. Other suitable laser Doppler sensors, such as the laser sensor by Avago Technologies Ltd. may be used.

In either case, the sensor assemblies 532 and/or 534 generate raw motion data that can be converted into processed motion data and then transmitted to the controlling mobile device 530 mounted within the automobile 522. The controlling mobile device 530 can use the raw motion data in a manner similar to that described above with reference to the controlling mobile devices 30 and 130.

Figure 7:
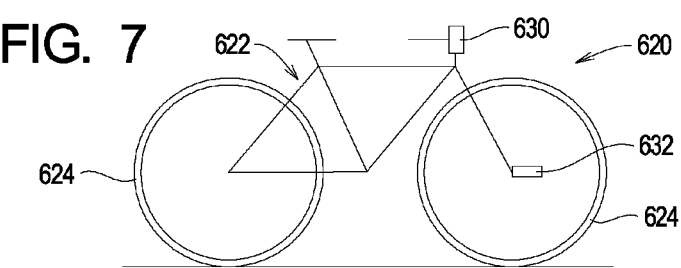
FIG. 7 is a somewhat schematic side elevation view depicting an example movement warning system of the present invention as applied to a bicycle.

Turning now to FIG. 7, depicted therein is yet another example movement warning system 620 mounted on a vehicle in the form of a bicycle 622 comprising a plurality of wheels 624. Instead of or in addition to motion sensors and/or accelerometers, the movement warning system 620 employs a controlling mobile device 630 and sensor assembly 632.

The sensor assembly 632 is a magnetic field or laser sensor arranged adjacent to one of the wheels 624. As described above, magnetic field and laser sensors can be adapted to generate data indicative of direction of rotation and rate of angular rotation of the wheel 624. The sensor assembly 632 thus generates raw motion data that can be converted into processed motion data and then transmitted to the controlling mobile device 630 mounted on the bicycle 622. The controlling mobile device 630 can use the raw motion data in a manner similar to that described above with reference to the controlling mobile devices 30 and 130.

Figure 8A:
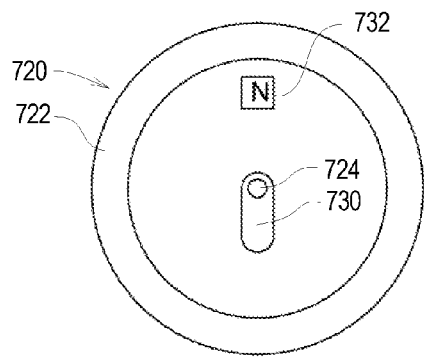
FIGS. 8A and 8B are side elevation and end views of a first example movement sensing system that may be used by a movement warning system of the present invention.
Figure 8B:
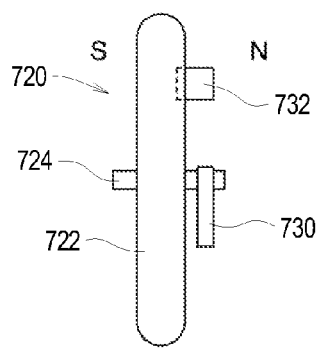

Turning now to FIGS. 8A and 8B, depicted therein is an example of a sensing system 720 that may be used in connection with a controlling mobile device of the present invention. The sensing system 720 is mounted on a wheel 722 supported by an axle 724 and comprises a magnetic field sensor 730 and a magnet 732. The magnetic field sensor 730 may be a sensor such as the HMC1512 sensor sold by Honeywell.

The magnetic field sensor 730 is mounted on the axle 724 such that the magnetic field sensor 730 is positioned near the center of the wheel 722 and extends perpendicular to the axle 724. The magnet 732 is attached to the wheel 722 so that the magnet 732 rotates with the wheel 722. The magnetic field sensor 730 detects changes in the direction of a magnetic field generated by the magnet 732.

Based on the change of the magnetic field, the sensor 730 can detect approximately 1 degree of rotation of the wheel 722. Knowing the diameter of the wheel 722, the linear speed, distance traveled, and acceleration of the vehicle can be calculated. The controlling mobile device connected to the sensor 730 can easily be calibrated for a particular wheel diameter. The raw motion data generated by the magnetic field sensor may be converted to processed data and transmitted to the controlling mobile device connected thereto.

The sensing system 720 may comprise an additional magnet arranged 180 degrees from the illustrated magnet 732 and aligned along the center of the wheel 722 with the magnet 732. In this case, if the polarities of the magnets are reversed from each other, the magnetic field detected by the sensor 730 will be amplified, and the accuracy of the sensing system 720 will be improved.

Figure 9A:
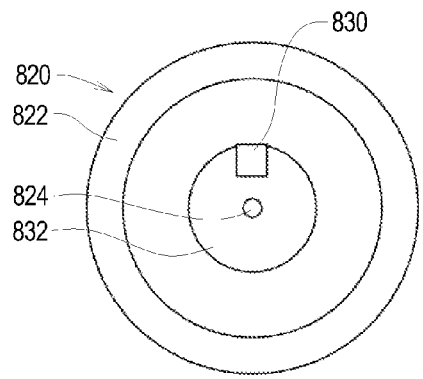
FIGS. 9A and 9B are side elevation and end views of a second example movement sensing system that may be used by a movement warning system of the present invention.
Figure 9B:
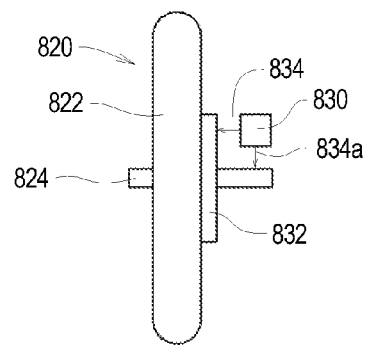

FIGS. 9A and 9B illustrate an embodiment of sensing system 820 for generating motion data indicative of rotation of a wheel 822 rotating about a shaft 824. The sensing system comprises a sensor 830 and, optionally, a disk 832 attached to the wheel 822. The sensor 830 is positioned in such a way that the laser beam 834 generated by the sensor 830 is directed towards the surface of the disk 832. The distance between the sensor 830 and the surface of the disk 832 depends on specifications of the sensor 830. For the Philips PLN2020 sensor, this distance is preferably within 2-3 millimeters.

Depending on the construction of the wheel 822, any surface that rotates with the wheel 822 and is non-transparent and relatively smooth and round may be used in place of the disk 832. The surface must be sufficiently uniform that a distance of approximately 2-3 millimeters can be maintained between the source of the laser beam 834 and the surface. In the example depicted in FIGS. 9A and 9B, for example, the shaft 824 is firmly attached to the wheel 822. Accordingly, the sensor 830 could be mounted to project a laser beam 834a towards the rotating shaft 824 to read motion data much the same way as from the disk 832. The sensor 830 can be mounted to the non-moving frame of a vehicle with custom made fittings and connected to the remaining components of the sensing system 820 using wires or wirelessly.

The sensing system 820 may be used on a bicycle wheel, in which case the disk would be attached to the wheel of the bicycle and a disk, such as a disk of a disk brake system. In this case, the sensor 830 is attached to a structural component of the bicycle such as the fork of a front or rear wheel.

To measure the exact distance that the wheel moves relative the surface, the sensor 830 may be calibrated from the controlling mobile device using a ratio of wheel circumference to the laser beam circumference for a full wheel rotation.

A controlling mobile device of the present invention may be configured to accept motion data from any one or more of the sensor systems described above. Alternatively, the sensor controllers may be designed to generate processed sensor data according to a predefined specification implemented by the controlling mobile device.

Data may be transmitted among the various components of the movement warning systems through wireless systems such as Bluetooth or through wired systems such as USB. In some situations, the vehicle may have a power supply appropriate for powering the components of the movement warning system; in others, batteries may be used to provide power.

From the forgoing, it should be apparent that the present invention may be embodied in forms other than those described above. The scope of the present invention should thus be determined based on the claims appended hereto and not the foregoing detailed description of example embodiments of the invention.

I claim:

1. A movement warning system for notifying a proximal entity of the approach of a vehicle comprising at least one wheel, comprising:
    a sensor system for generating motion data indicative of movement of the vehicle, where the sensor system comprises
        at least one magnet supported by the at least one heel such that the at least one magnet rotates with the at least one wheel along a magnet path, and
        a magnetic field sensor supported in a fixed relationship to the magnet path, where the magnetic field sensor generates the motion data based on changes direction of a magnetic field established by the magnet relative to the magnetic field sensor;
    a controlling mobile device for generating at least one warning signal based on at least one of linear speed distance traveled and acceleration of the vehicle where the at least one of the linear speed, distance traveled, and acceleration is calculated based on the motion data and a diameter of the at least one wheel; and
    a signal generator system for generating at least one warning based on the at least one warning signal; whereby
    the signal generator generates the warning such that the proximal entity perceives the warning.

2. A movement warning system as recited in claim 1, in which the controlling device is a portable computing device.

3. A movement warning system as recited in claim 1, in which the sensor system comprises a motion detector.

4. A movement warning system as recited in claim 1, in which the sensor system comprises an accelerometer.

5. A movement warning system as recited in claim 4, in which the accelerometer generates data indicative of movement in three orthogonal directions.

6. A movement warning system as recited in claim 1, in which the controlling device generates the at least one warning signal based on at least one digital audio file.

7. A movement warning system as recited in claim 6, in which each digital audio file is associated with a mode of operation of movement warning software running on the controlling mobile device.

8. A movement warning system as recited in claim 1, in which:
    the controlling mobile device generates the at least one warning signal based on a plurality of digital audio files; and
    each digital audio file is associated with a mode of operation of movement warning software running on the controlling mobile device.

9. A movement warning system as recited in claim 8, in which the movement warning software running on the controlling mobile device operates in at least one mode selected from the group of modes comprising SLEEP mode, IDLE mode, START mode, ACCELERATION mode, DECELERATION mode, and COASTING MODE.

10. A movement warning system as recited in claim 1, in which the signal generator system comprises an amplifier and a transducer, where the amplifier amplifies the at least one warning signal and the transducer generates an audible sound signal based on the at least one amplified warning signal.

11. A movement warning system as recited in claim 1, in which the signal generator system comprises an amplifier and a transducer, where the amplifier amplifies the at least one warning signal and the transducer generates a low frequency sound signal based on the at least one amplified warning signal.

12. A sensor system for detecting movement of a wheel of a vehicle, comprising:
- at least one magnet supported by the wheel such that the at least one magnet rotates with the wheel along a magnet path; and
- a magnetic field sensor supported in a fixed relationship to the magnet path; whereby
- the magnetic field sensor generates the motion data based on changes of angular direction of a magnetic field established by the magnet relative to the magnetic field sensor; and
- at least one of linear speed, distance traveled and acceleration of the vehicle is calculated based on the motion data and a diameter of the wheel.

13. A sensor system as recited in claim 12, in which:
- the wheel is supported by an axle; and
- the magnetic field sensor is supported in a fixed relationship relative to the axle.

14. A sensor system as recited in claim 12, in which the at least one magnet is supported by the wheel such that the at least one magnet rotates with the wheel along a magnet path.

* * * * *